Oct. 30, 1934.  G. H. HAINES  1,978,865
EXTENSIBLE ROD OR POLE
Filed May 31, 1933
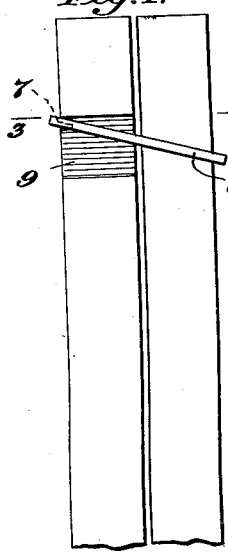
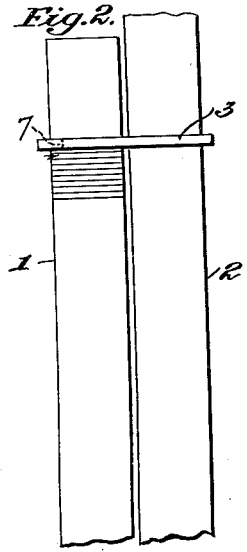
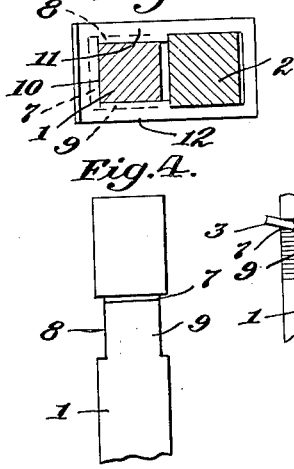
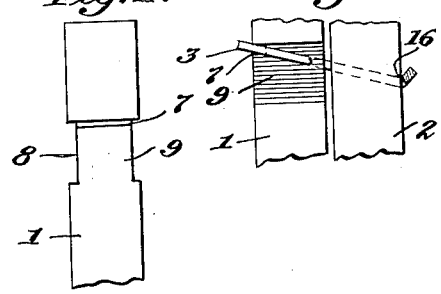
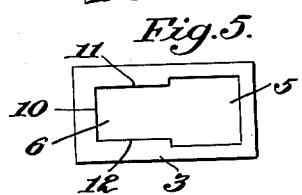
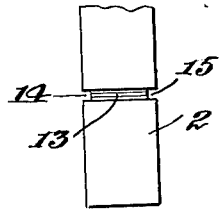
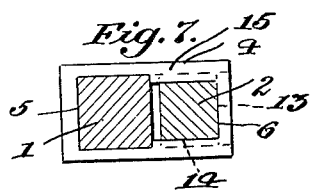
Inventor:
Glen H. Haines;

Patented Oct. 30, 1934

1,978,865

UNITED STATES PATENT OFFICE 1,978,865

EXTENSIBLE ROD OR POLE

Glen H. Haines, Cuyahoga Falls, Ohio

Application May 31, 1933, Serial No. 673,763

3 Claims. (Cl. 248—2)

My invention relates to extensible rods or poles, that is, rods or poles formed in two sections one sliding on the other and provided with means holding the two sections together in such a way that on moving the sliding section to expanded position it will be automatically gripped and held against return movement until the gripping or holding means is released.

My invention relates particularly to the means by which the two members or sections of an extensible rod or pole are so held together as to be adapted for the above described action and it is an object of my invention to provide a link of simple and inexpensive construction adapted to hold the two members or sections together so as to permit free movement one upon the other. It is a further object of my invention to provide the members or sections with means for holding the links.

It should be understood that while my invention is particularly adapted for use with extensible rods or poles which are for use in vertical position, such as clothes poles, or props, flag poles, guy poles, push poles, and any and all poles for extension upward or downward, the invention may also be used with extensible poles, rods, rules or the like in which a sliding member is movable horizontally.

With the objects above indicated and other objects hereinafter explained my invention consists in the construction and combination of elements hereinafter described and claimed.

Referring to the drawing:

Figure 1 is a front view of an extensible pole or rod embodying my invention, showing the locking link in locking position the rod members being shown slightly separated;

Figure 2 is a similar view showing the link in position to permit the sliding member to move upward;

Figure 3 is a cross-sectional view on line 3—3 of Figure 1;

Figure 4 is a side view of the lower or base member;

Figure 5 is a plan view of my improved link;

Figure 6 is a side view of the sliding member,

Figure 7 is a cross-sectional view on line 7—7 of Figure 1, and

Figure 8 is an edge view partly in cross section of a modified form of clamping unit.

In the drawing 1 indicates the lower or base member of the extension rod or pole and 2 indicates the upper or sliding member. The lower or base member 1 carries near its upper end a clamping or gripping link 3 and the sliding member carries near its lower end a link 4. The two links 3 and 4 are identical in construction being each formed from a piece of sheet metal of substantial thickness. They are each rectangular in shape with length somewhat greater than the combined widths of members 1 and 2 and with width somewhat greater than the thickness of these members. Through the piece of sheet metal is formed two rectangular connected openings of which 5 is of sufficient size to permit a member 1 or 2 to slide freely through it and 6 is less in size.

Near its upper end base member 1 is provided on its side away from central contact with member 2 with a transverse groove 7 of a width slightly greater than the thickness of link 3 and on its front and back it is cut away as shown at 8 and 9 so that the portion of the strip between these recesses 8 and 9 will correspond to the width of the portion 6 of the opening in link 3.

In use link 3 is slipped over the end of member 1 by placing portion 5 of the opening in the link over its end and then the end 10 of the narrow portion 6 is caused to engage groove 7 and the sides 11 and 12 engage recesses 8 and 9. When the sliding member 2 is moved toward extended position link 3 will be moved toward the position in which it is shown in Figure 2, the links permitting member 2 to slide freely through it. When member 2 stops upward movement link 3 drops to the position in which it is shown in Figure 1 and resists downward movement by clamping member 2 to member 1.

Link 4 carried by member 2 near its lower end is the same in construction as link 3 but in use the narrow opening 6 engages groove 13 in the side away from contact with member 1 and grooves 14, 15, in the front and back of the member, these grooves being arranged to so hold the link that it extends at right angles to the contacting face of member 2 so that member 1 may slide freely through it.

It will readily be understood that sliding member 2 may be moved freely towards expanded position, link 3 swinging upward but as soon as the upward movement ceases link 3 swings down and by binding against the side of member 2 stops its downward movement. When it is desired to lower the free end of sliding member link 3 must be swung upward so that it will no longer grip the sliding member. As link 4 is held against swinging movement it permits member 1 to slide freely through it both upward and downward.

While link 4, the lower link, is shown as a guide link, and the uper link 3 is depended on as the means for effecting the clamping action, the lower link may also be a clamping link, member 1 in such case being provided near its lower end with recesses corresponding to recesses 8 and 9.

In Figure 8 is shown a modified form of clamping link 3 the modification consisting in the upwardly bent end of the link by which a sharp edge 16 is presented to bite into the side surface of member 2.

Having thus described my invention, what I claim is:—

1. A device of the character described including a pair of rod members rectangular in cross section, one of which has a portion thereof between its ends recessed on three sides so as to reduce its cross sectional area, and means for holding said rod members in overlapping position, said means comprising a link adapted to extend about said rod members consisting of a flat plate having an opening therein having a larger portion adapted to receive the unrecessed portion of one of the rod members and permit it to slide through it and having a portion of less size adapted to fit the recessed portion of the other rod member.

2. A device of the character described including a pair of rod members rectangular in cross section, one of which has a portion thereof between its ends recessed on three sides so as to reduce its cross sectional area, the recesses of two opposite sides being of greater extent longitudinally of the rod than that of the recess of the side between said opposite sides, and means for holding said rod members in overlapping position, said means comprising a link adapted to extend about said rod members consisting of a flat plate having an opening therein having a larger portion adapted to receive the unrecessed portion of one of the rod members and permit it to slide through it and having a portion of less size adapted to fit the recessed portion of the other rod member.

3. A device of the character described including a pair of rod members rectangular in cross section, one of which has portions thereof between its ends recessed on three sides so as to reduce the cross sectional area of such portions, and means for holding said rod members in overlapping position, said means comprising a pair of links adapted to extend about said rod members, each consisting of a flat plate having an opening therein having a larger portion adapted to receive the unrecessed portion of one of the rod members and permit it to slide through it and having a portion of less size adapted to fit the recessed portion of the other rod member.

GLEN H. HAINES.